United States Patent
Burke et al.

(10) Patent No.: US 7,946,403 B2
(45) Date of Patent: *May 24, 2011

(54) MECHANICAL DISCONNECT DUAL-SIDED INTERLOCKING TEETH

(75) Inventors: David W. Burke, Oro Valley, AZ (US); Balwinder S. Birdi, Tucson, AZ (US); Arturo Maceda, Mexicali (MX)

(73) Assignee: Honeywell International Inc., Morristown, NJ (US)

( * ) Notice: Subject to any disclaimer, the term of this patent is extended or adjusted under 35 U.S.C. 154(b) by 550 days.

This patent is subject to a terminal disclaimer.

(21) Appl. No.: 12/042,137

(22) Filed: Mar. 4, 2008

(65) Prior Publication Data

US 2009/0224727 A1    Sep. 10, 2009

(51) Int. Cl.
*H02P 9/06*    (2006.01)
*F16D 11/04*    (2006.01)

(52) U.S. Cl. ...... 192/90; 192/69.8; 192/101; 192/114 R; 192/114 T; 322/12

(58) Field of Classification Search ........... 192/69.2, 192/69.8, 114 T; 322/12
See application file for complete search history.

(56) References Cited

U.S. PATENT DOCUMENTS

| | | | |
|---|---|---|---|
| 3,001,620 A * | 9/1961 | Olchawa et al. | 192/24 |
| 3,550,738 A * | 12/1970 | Halibrand | 192/53.5 |
| 4,042,088 A * | 8/1977 | Schmohe | 192/114 R |
| 4,685,550 A | 8/1987 | Metcalf | |
| 4,997,072 A | 3/1991 | Lapthorne | |
| 5,103,949 A | 4/1992 | Vanderzyden et al. | |
| 5,505,662 A | 4/1996 | Giberson | |
| 7,728,477 B2 * | 6/2010 | Birdi et al. | 310/94 |
| 2005/0133331 A1 | 6/2005 | Howard | |
| 2009/0056498 A1* | 3/2009 | Birdi et al. | 74/840 |
| 2009/0224728 A1* | 9/2009 | Burke et al. | 322/41 |

FOREIGN PATENT DOCUMENTS

GB    2081822 A    *    2/1982

* cited by examiner

*Primary Examiner* — Richard M. Lorence
(74) *Attorney, Agent, or Firm* — Oral Caglar, Esq.

(57) ABSTRACT

A disengagement/disconnect assembly for disengaging a generator from a gear box may include an inner ball screw having an angled threading on an outer surface thereof and surrounding and operatively engaged to a rotating generator drive shaft to cause rotation of the inner ball screw. The inner ball screw may be attached to an engagement member having undercut and interlockable teeth engaged to corresponding teeth of an engagement member of the gear box. An outer ball screw may surround and normally rotate with the inner ball screw. A helical ball track may be formed between the inner and outer ball screws. A brake may be provided for slowing or stopping rotation of the outer ball screw so that the inner ball screw rotates relative to the outer ball screw along the ball track and slides axially away from the gear box thereby disengaging the generator from the gear box drive shaft.

9 Claims, 8 Drawing Sheets

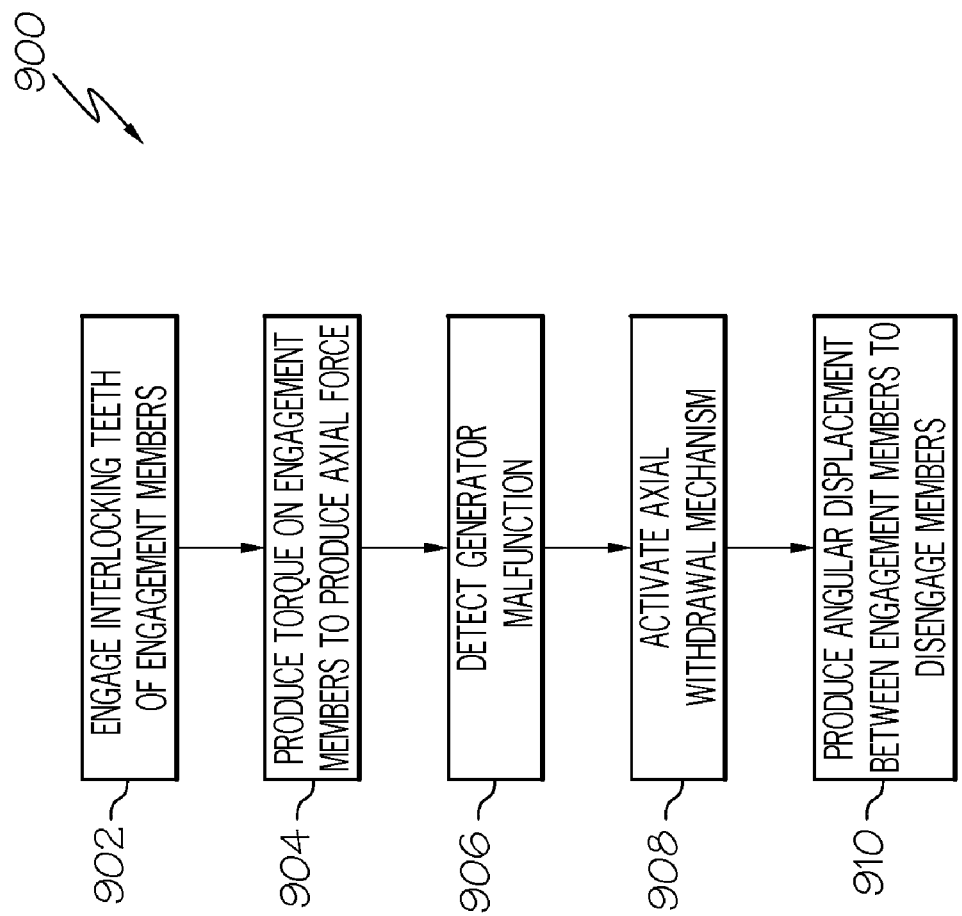

MECHANICAL DISCONNECT DUAL-SIDED INTERLOCKING TEETH

BACKGROUND OF THE INVENTION

The present invention generally relates to apparatus and methods for disengaging generators and other rotating machines from a prime mover and, more particularly, to apparatus and methods of disengaging an aircraft generator from an engine or gear box to prevent damage to the engine or gear box.

In the aerospace industry, aircraft receive electric power from generators. The generators may be coupled to the main engine or to auxiliary power units through a gear box. Known designs of generators have a generator drive shaft that includes some kind of shear section that is based on safe operational capability of the gearbox. In the event that the generator malfunctions, this shear section operates and protects the gear box from continuing to rotate under an unacceptable load from a malfunctioning generator that may have stopped rotating. For constant speed generators, the design of the shear section is not difficult—it is easy to design a shear section to meet one speed. However, with the evolution of variable frequency generators (VFG), where failure can occur over a range of speeds, it is rather difficult to design a shear section that can protect the gear box regardless of the multiple possible speeds of the generator.

It is therefore useful that some other means should be incorporated into the design of the generator that would help protect the gear box. If, for example, there is a minor fault with the generator and it is not producing any power but rather is rotating like a load on the gear box, it is desirable that the generator be de-coupled from the gear box.

It is also useful that such a protection means should not interfere with proper engagement of the generator with the gearbox irrespective of whether a generator shaft is producing load on the gearbox or alternatively when the gearbox may be producing mechanical load on the generator shaft.

As can be seen, there is a need to disengage the generator from the gear box as needed when the generator malfunctions. Furthermore, there is a need to have such a disengaging mechanism that is re-settable by the operator or maintenance personnel of the aircraft when the problem with the generator is fixed or addressed. It is also required that the disconnect mechanism not disengage unnecessarily and not inadvertently engage when disconnected.

SUMMARY OF THE PRESENT INVENTION

In one aspect of the present invention a dis-engageable generator drive system comprises a first engagement member coupled to a generator, and a second engagement member coupled to an engine. The engagement members have a plurality of circumferentially disposed teeth. The teeth have a distal circumferential width at their distal ends and a proximal circumferential width at their proximal ends wherein the distal circumferential width is greater than the proximal circumferential width.

In a further aspect of the invention a disengagement assembly for disengaging a generator from an engine comprises an axially displaceable engagement member. The engagement member has a plurality of circumferentially disposed teeth. The teeth have a distal circumferential width at their distal ends and proximal circumferential width at their proximal ends wherein the distal circumferential width is greater than the proximal circumferential width.

In another aspect of the invention a method of driving a generator with an engine comprises the steps of Interlockingly engaging the engine with an inner ball screw having an angled threading on an outer surface thereof, engaging the inner ball screw with an outer ball screw that rotates with the inner ball screw, including an angled ball track between the inner ball screw and the outer ball screw on which a ball bearing travels, and actuating a brake to slow or stop rotation of the outer ball screw so that the inner ball screw rotates relative to the outer ball screw along the ball track and slides axially away from the engine thereby disengaging the generator from the engine.

These and other features, aspects and advantages of the present invention will become better understood with reference to the following drawings, descriptions and claims.

BRIEF DESCRIPTION OF THE DRAWINGS

FIG. 9 is a flow chart showing a method in accordance with the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a disengagement assembly for a rotating machine, such as an aircraft generator, for disengaging the generator from an engine or gear box. Typically, the drive shaft of the generator may be rotating and operatively engaged to the drive shaft of the gear box. When the generator is not working properly, for example in an aircraft, the disengagement assembly may allow a pilot to disengage the generator from the gear box. The disengagement assembly may be a modular or standalone assembly having its own housing separate from the housing of the generator, or alternatively the disengagement assembly may be subsumed within the housing of the generator. The disengagement assembly may be used in aircraft and may be re-settable manually on the ground after repair of the generator.

In contrast to the prior art, which does not use interlocking engagement teeth, the disengagement assembly of the present invention may utilize a ball screw mechanism to provide a desired axial positioning of novel engagement teeth which maintain an interlocking relationship with one another irrespective of direction of torque application during proper operation of the generator. The interlocking teeth may disengage from one another in the event of a malfunction of the generator. In further contrast to the prior art, in which the disconnect mechanism has to self-destruct in order to function; the disengagement assembly of the present invention may be resettable and reusable.

Figure 1:
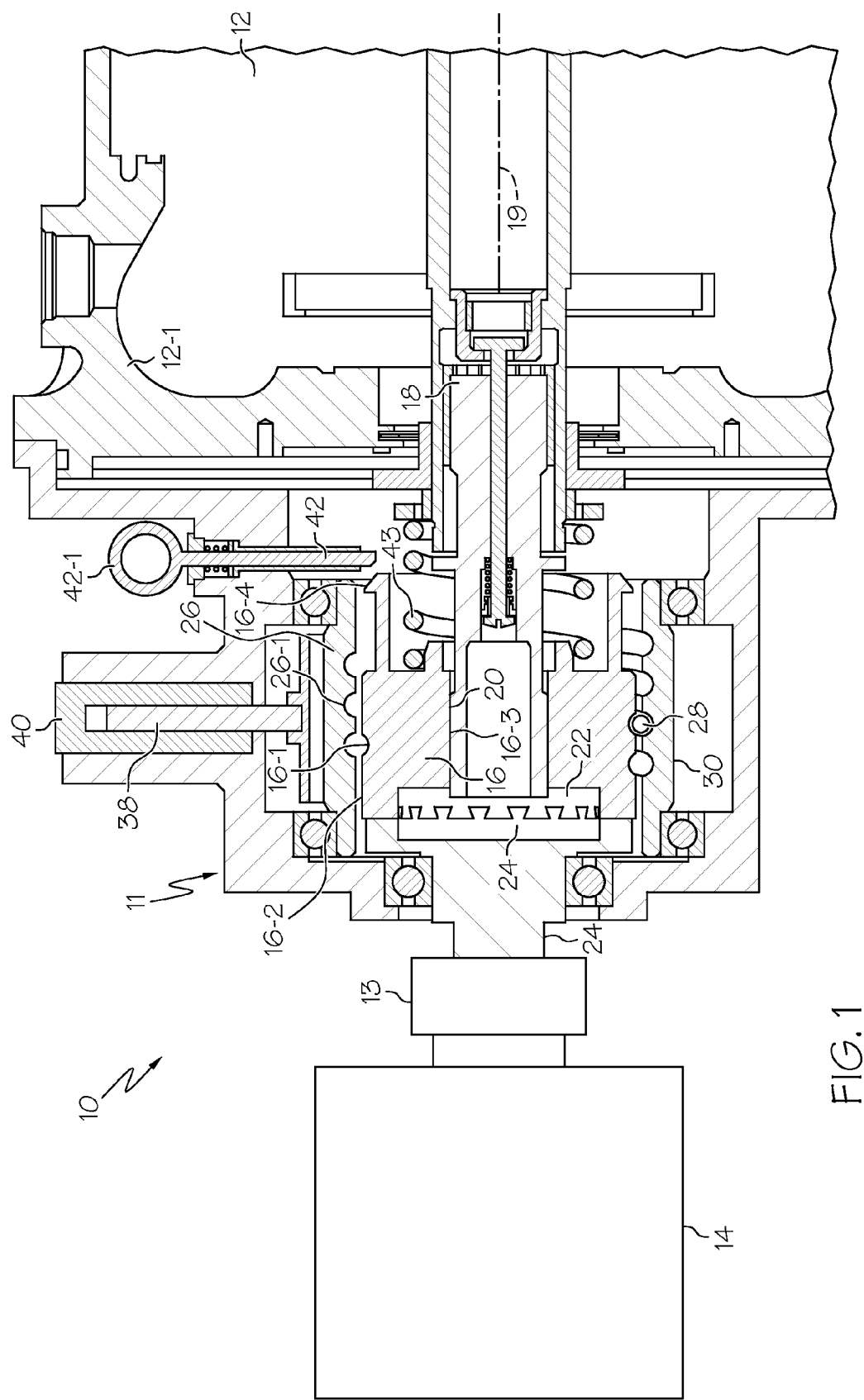
FIG. 1 is a sectional view of a drive system wherein a generator is in its normal state engaged with an engine in accordance with the invention.
Figure 2:
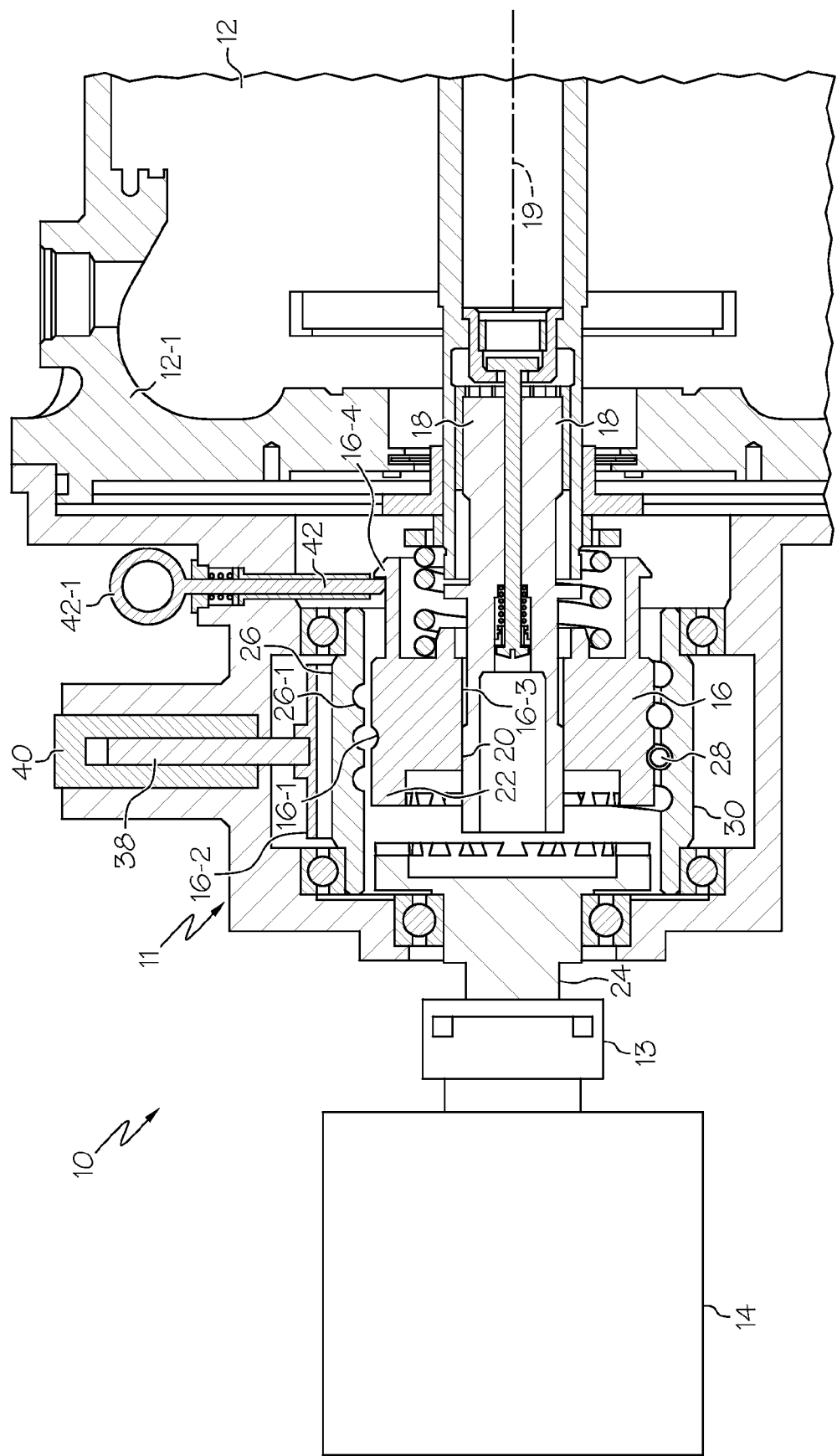
FIG. 2 is a sectional view of the disengagement assembly of FIG. 1 wherein the generator is disengaged from the engine in accordance with the invention.

As seen from FIGS. 1 and 2, a generator drive system 10 may be provided with a disengagement assembly 11 for disengaging a variable frequency generator 12 from a gear box 13 of a prime mover or engine 14. The disengagement assembly 11 may comprise a rotatable inner ball screw 16 that has angled threading 16-1 on an outer surface 16-2 of inner ball screw 16.

Since inner ball screw 16 may be hollow, inner ball screw 16 may surround and may be operatively engaged to a generator drive shaft 18 so that the rotation of generator drive shaft 18 on an axis 19 may cause rotation of inner ball screw 16. In this regard, there may be radially protruding splines 20 between the surface of generator drive shaft 18 and an inner surface 16-3 of inner ball screw 16. The splines 20 or another suitable structure may serve to transfer rotational force of the generator drive shaft 18 to inner ball screw 16.

Inner ball screw 16 may have an engagement member 22, at an end distal to the generator 12. This engagement member 22 may be normally engaged to a corresponding engagement member 24 which may be connected to the gearbox 13 or optionally to the engine 14 if a gearbox is not utilized.

Disengagement assembly 11 may also include an outer ball screw 26 which may surround and may normally rotate with inner ball screw 16. As seen in FIG. 2, outer ball screw 26 may have associated with it one or more balls 28, called ball bearings, that travel on an angled ball track 30 that exists between the inner ball screw 16 and outer ball screw 26. In one exemplary embodiment, there may be between approximately five and seven such balls depending upon the design requirement. The angled ball track 30 may be formed from threading 16-1 on the inner ball screw 16 and outer threading 26-1 formed on the outer ball screw 26. The fact that the ball track 30 is angled means that ball track 30 has some axial component rather than simply being a series of revolutions around inner ball screw 16.

Disengagement assembly 11 may also include a brake 38 that may be capable of slowing or stopping rotation of outer ball screw 26. When the brake 38 slows or stops rotation of outer ball screw 26, since normally inner ball screw 16 rotates together with outer ball screw 26, this slowing or stopping of the rotation of outer ball screw 26 may cause inner ball screw 16 to rotate relative to outer ball screw 26 along ball track 30 and simultaneously slide axially away from the engine 14 thereby disengaging the generator 12 from the engine 14. When inner ball screw 16 slides axially away from engine 14, inner ball screw 16 may be sliding on generator drive shaft 18, and more precisely on splines 20 between the surface of generator drive shaft 18 and inner surface 16-3 of inner ball screw 16.

Accordingly, outer ball screw 26 may be capable of rotation and inner ball screw 16 may be capable of both rotation and axial movement. The brake 38 may be connected to a solenoid 40 that may be remotely actuatable by an aircraft pilot when generator 12 malfunctions. Other arrangements may easily be imagined whereby brake 38 may be controlled directly or indirectly with other mechanisms.

Figure 4:
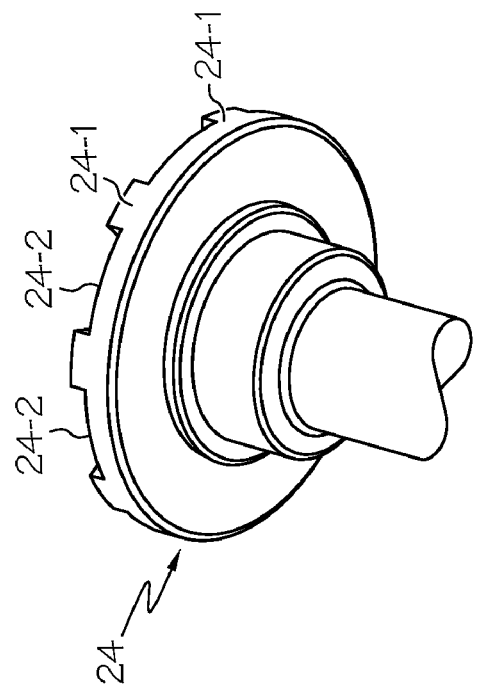
FIG. 4 is a perspective view of an engine-side engagement member in accordance with the invention.
Figure 3:
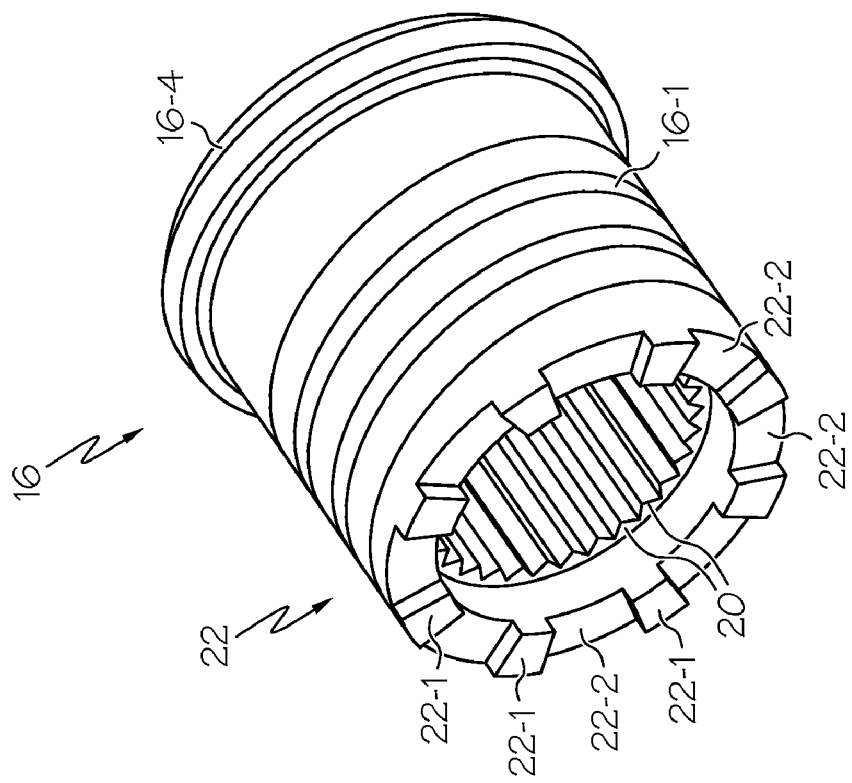
FIG. 3 is a perspective view of a generator-side engagement member in accordance with the invention.

Referring now to FIGS. 3 and 4 it may be seen that the engagement member 22 may include interlockable teeth 22-1 and the corresponding engagement member 24 of the gear box drive shaft adaptor 14 may also include interlockable teeth 24-1 that mate with the teeth 22-1. In an exemplary embodiment shown in FIG. 3 the teeth 22-1 may be positioned circumferentially around the engagement member 22. It may also be noted that while an exemplary number of eight of the teeth 22-1 are shown in FIG. 3, each of the teeth 22-1 covers only about 15 degrees of angular displacement around the circumference of the engagement member 16. Recesses 22-2 between the teeth 22-1 cover a larger portion of the circumference than the teeth 22-1. Each of the recesses 22-2 may cover about thirty degrees of angular displacement of the circumference. In this regard it may be seen that recesses 22-2 may be about twice as wide as their respective adjacent teeth 22-1. The engagement member 24 shown in FIG. 4 may also be provided with similar teeth 24-1 and recesses 24-2 which may interconnect and interlock with the teeth 22-1 and recesses 22-2 of the engagement member 22.

Figure 5:
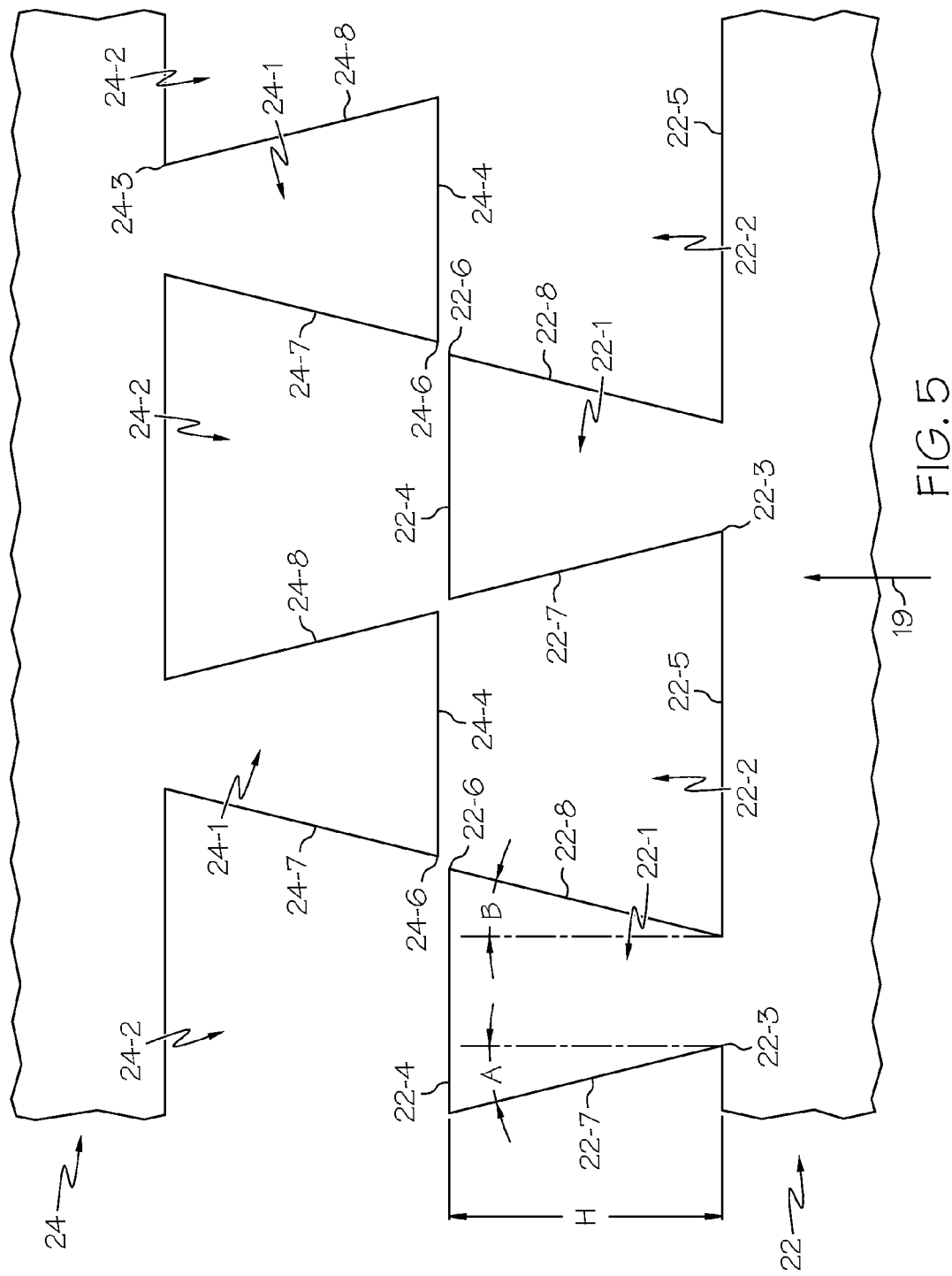
FIG. 5 is a graphical representation of teeth and recesses of the engagement members of FIGS. 3 and 4 in accordance with the invention.
Figure 6:
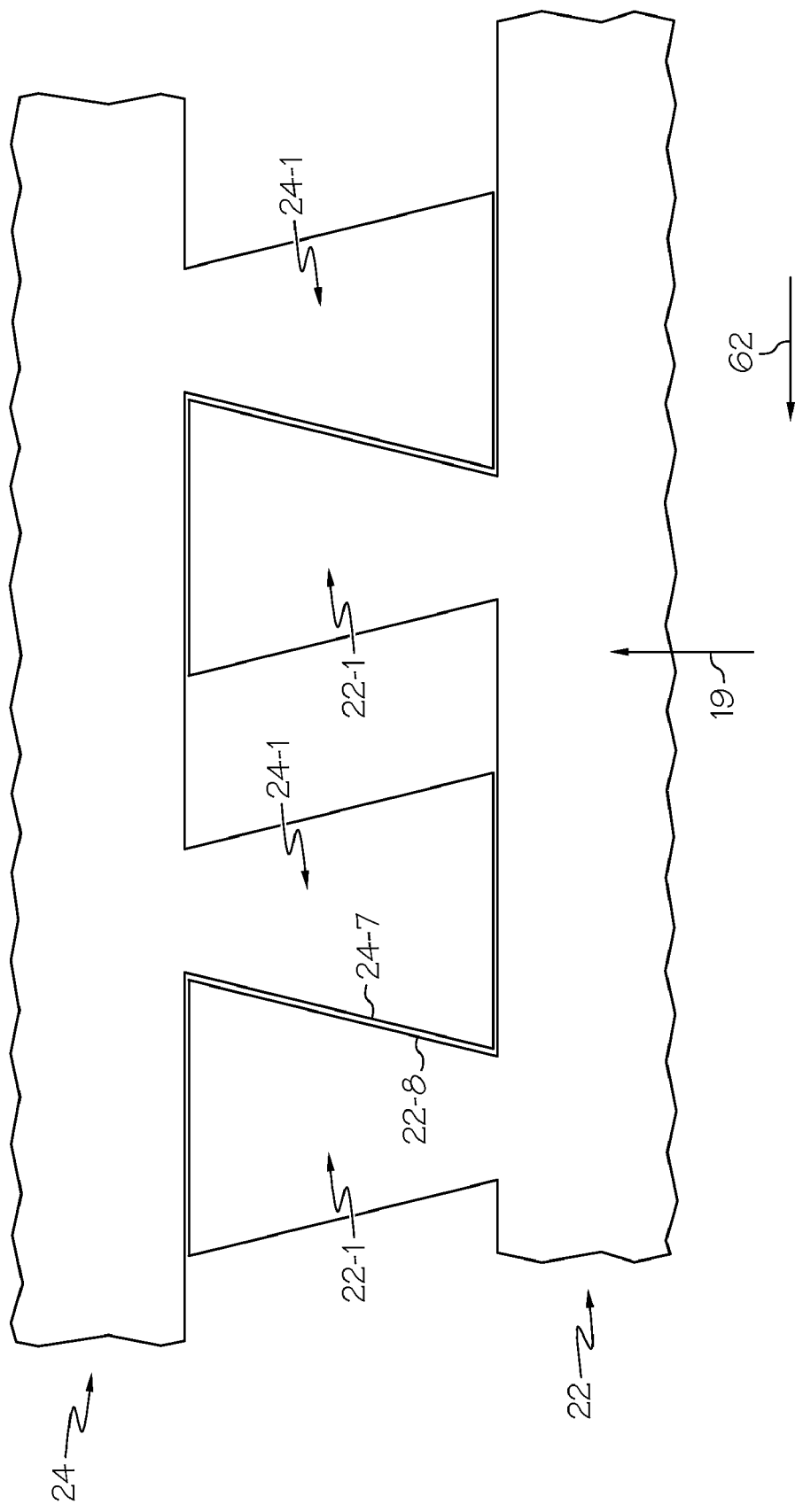
FIG. 6 is a graphical representation of teeth and recesses of the engagement members of FIGS. 3 and 4 in accordance with the invention.
Figure 7:
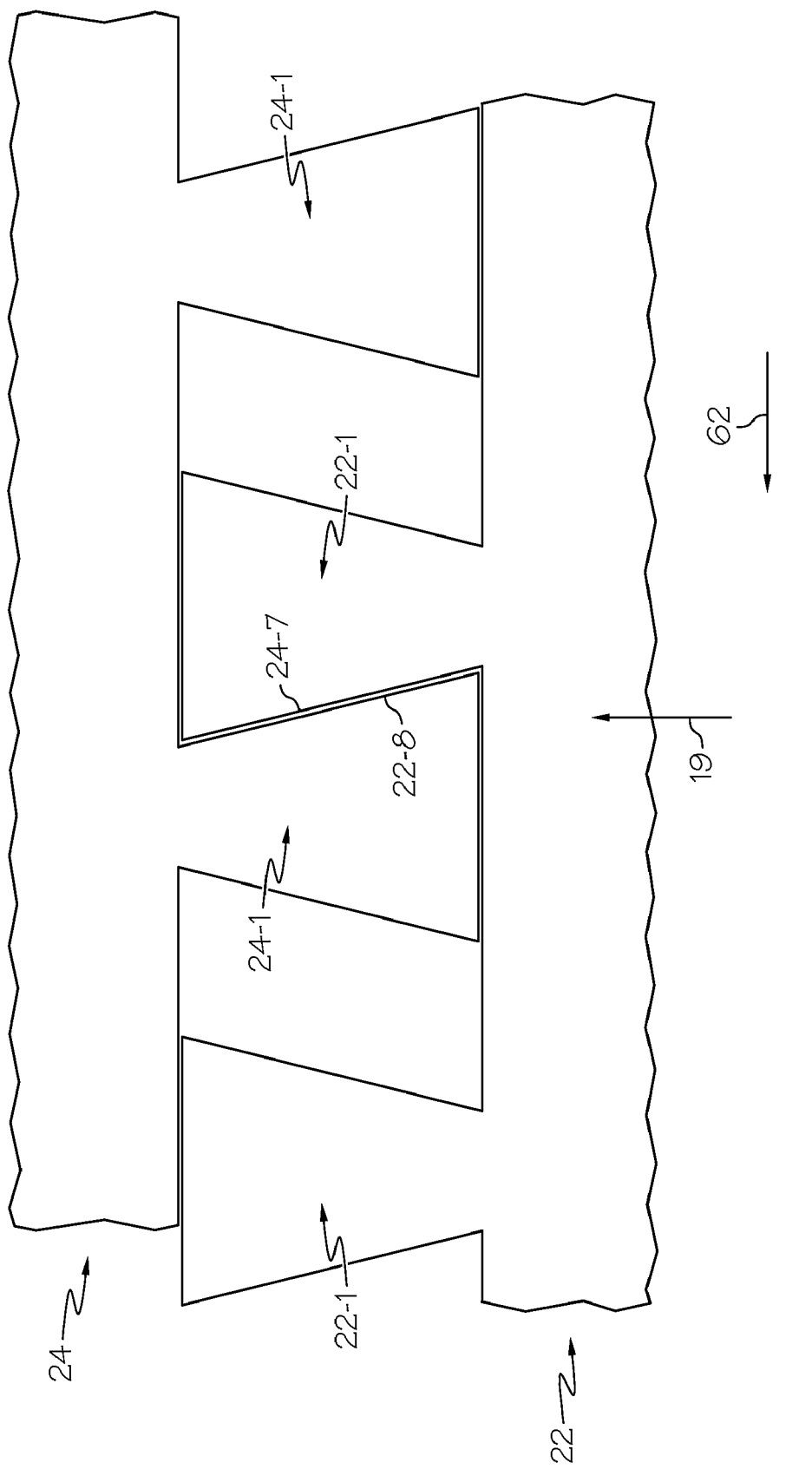
FIG. 7 is another graphical representation of teeth and recesses of the engagement members of FIGS. 3 and 4 in accordance with the invention.

Referring now to FIGS. 5, 6 and 7, a novel relationship of the teeth 22-1 and 24-1 and the recesses 22-1 and 24-2 may be appreciated. Referring particularly to FIG. 5, consider first a configuration of engagement member 22. Each of the teeth 22-1 may be formed with a proximal end 22-3 smaller than a distal end 22-4. In other words, each of the teeth 22-1 may be formed with a profile that resembles a truncated pyramid. Each of the recesses 22-2 may be formed with a proximal end 22-5 larger than a distal end 22-6. Tooth sides 22-7 may be formed at an angle A relative to an axis 19 of the generator 12 of FIG. 1. Tooth sides 22-8 may be formed at the angle B relative to the axis 19.

The engagement member 24 may have its teeth 24-1 and its recesses 24-2 formed in the same manner as the teeth 22-1 and the recesses 22-2 of the engagement member 22.

FIGS. 5, 6 and 7 are intended to provide a readily understandable graphical representation of the interlocking nature of the teeth 22-1 and 24-1 and the recesses 22-2 and 24-2. As such FIGS. 5, 6 and 7 may not show their respective objects in scale. In an actual exemplary embodiment of the invention, the angles A and B may be equal in magnitude and opposite in direction relative to the axis 19. The angles A and B may be between about three degrees and about one degree. Each of the teeth 22-1 and 24-1 may have a height H of about 0.050 inch to about 0.150 inch. In a typical exemplary embodiment the engagement member 22 may have a diameter of between about 2 inches to about 3 inches. In this context each of the recesses 22-2 and 24-2 may have a distal width of between about 0.50 inch and 0.80 inch. Each of the teeth 22-1 and 24-1 may have a distal width of about 0.25 inch to about 0.40 inch.

Referring now particularly to FIG. 6, it may be seen how the teeth 22-1 and 24-1 interact with one another when the engine 14 or its gearbox 13 may apply a torque load to the generator 12, i.e. when engagement member 24 drives engagement member 22. FIG. 6 shows a direction of rotation arrow 62 portraying a counterclockwise rotation of the generator 12 and the engine 14. Left-hand sides 24-7 of each of the teeth 24-1 may engage with and produce circumferential force on right-hand sides 22-8 of the teeth 22-1. Because each of the teeth 22-1 and 24-1 may be shaped as truncated pyramids, the sides 24-7 and 22-8 of the teeth 24-1 and 22-1 may engage with one another to produce an axial force. In other words, the engagement member 22 may be drawn toward engagement member 24 in an axial direction.

As torque load increases, the axial force increases correspondingly. In a typical aircraft generating system rotational speeds of 24,000 revolutions per minute (rpm) may develop.

Torque loads of 300 foot-pounds may also be encountered, increasing torque and speed often results in increased vibration. Increased vibration may increase a risk that the engagement members 22 and 24 may inadvertently release from one another. The novel arrangement of interlocking angled teeth 22-1 and 24-1 may provide desirable axial force that may increase with increasing torque. Thus the risk of inadvertent disengagement may be reduced.

Referring now particularly to FIG. 7, it may be seen how the teeth 22-1 and 24-1 interact with one another when the generator 12 applies a torque load to the engine 14. FIG. 7 shows a direction of rotation arrow 62 portraying a counter-clockwise rotation of the generator 12 and the engine 14. Left-hand sides 22-7 of each of the teeth 22-1 may engage with and produce circumferential force on right-hand sides 24-8 of the teeth 24-1. As described with respect to FIG. 6, the teeth 22-1 and 24-1 may engage with one another to produce an axial force. In other words, the engagement member 22 may be drawn toward engagement member 24 in an axial direction.

Considering both FIGS. 6 and 7 it may be seen that irrespective of whether the generator 12 is being driven by torque from the engine 14 or is producing torque force on the engine 14, the teeth 22-1 and 24-1 may remain engaged. Additionally, it may be seen that the teeth 22-1 and 24-1 may produce axial force in the presence of torque provided by either the generator 12 or the engine 14. Thus, the inventive engagement members 22 and 24 may provide effective torque transmission under many different operating conditions. For example, during engine start-up the generator 12 may be employed as a starter motor. In that case, the generator 12 may drive the engine 14, i.e., the engagement member 22 may drive the engagement member 24. Conversely, during steady-state operation of the engine 14, the engine 14 may produce torque load on the generator 12 and the engagement member 24 may drive the engagement member 22. In the event of engine deceleration, the engagement member 22 may again drive the engagement member 24.

Figure 8:
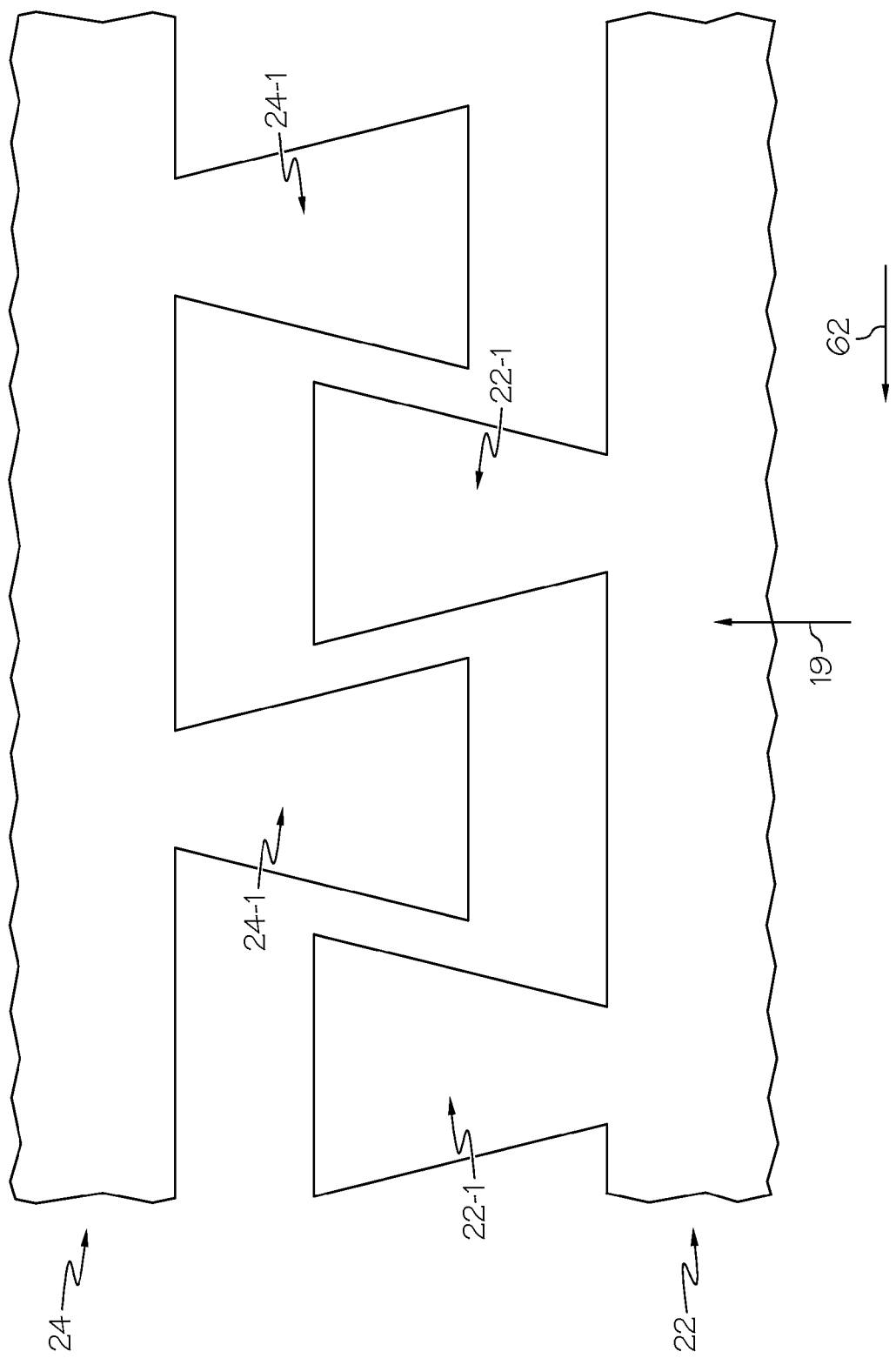
FIG. 8 is a graphical representation of teeth and recesses of the engagement members of FIGS. 3 and 4 in a disengaged state in accordance with the invention.

Referring now to FIG. 8 and back to FIG. 2, it may be seen that upon application of the brake 38, the engagement members 22 and 24 may be axially displaced from one another and thus separated. In such an event the engagement members 22 and 24 may slightly rotate relative to one another. This slight relative rotation may provide relative displacements of the teeth 22-1 and 24-1 relative to one another as shown in FIG. 8. Each of the teeth 22-1 and 24-1 may be angularly displaced relative to the recesses 22-2 and 24-2. Each of the recesses 22-2 and 24-2 may have a circumferential width greater than that of each of the teeth 22-1 and 24-1. In the case of the exemplary embodiment described herein, each of the recesses 22-2 and 24-2 may be twice as wide as the respective teeth 24-1 and 22-1. However, it should noted that the distal width of the recesses 22-2 and 24-2 need only be greater than the distal width of the teeth 22-1 and 24-1 in order to allow for operations of the disengagement assembly 10. In other words, the distal ends 22-6 and 24-6 of the recesses 22-2 and 24-2 may be wider than the distal ends 22-4 and 24-4 of the teeth 22-1 and 24-1. The teeth 22-1 and 24-1 may require only a few degrees of angular displacement relative to one another before the teeth 22-1 and 24-1 may freely move axially relative to one another.

The disconnect assembly 11 may also include a locking mechanism 42 for locking inner ball screw 16 in place after inner ball screw 16 has moved laterally/axially away from the engine 14 to disengage generator 12 from the engine 14 or its gearbox 13.

As seen in FIG. 1, one example of lock mechanism 42 is shown whereby the lock may be a simple key or pin 42-1 whose bottom is urged up momentarily by a slanted back shoulder 16-4 at a proximal end of inner ball screw 16, and then falls back down once slanted back tooth 16-4 passes key 42-1, thereby ensuring that inner ball screw 16 is held in place by lock 42 (i.e. cannot reverse direction) until key 42-1 is re-set. The re-setting of lock 42 may be performed manually by an operator which may be achieved manually on the ground by releasing lock 42 such as by causing key 42-1 to be lifted. This may allow spring 43 to push inner ball screw 16 back to its normal position engaged to the engine. Accordingly, when the lock 42 is later manually released, inner ball screw 16 automatically may revert to its engagement position by rotating through ball track 30 in a reverse direction and sliding axially. The generator 12 may be then re-engaged to the gear box 13 or the engine 14 for future normal operation.

Although as seen from FIGS. 1-2, the entire disconnect mechanism 11 may be outside of a housing 12-1 of generator 12 and may have its own housing (not shown), it is also contemplated by the present invention that in certain embodiments disengagement/disconnect assembly 11 may also be subsumed within and utilize housing 12-1 of generator 12.

Referring now to FIG. 9, which is a flow chart, it may be seen that the present invention also envisions a method 900 of driving a rotating machine such as a variable frequency generator with an engine and disengaging the generator in the event of a malfunction of the generator. In a step 902, engagement members may be interlockingly engaged (e.g., the engagement members 22 and 24 may be engaged with interlocking of the teeth 22-1 and 24-1 into the recesses 22-2 and 24-2). In a step 904, torque may be applied to the engagement members to produce an axial force (i.e., angled sides 22-7, 22-8, 24-7 and 24-8 may produce axial force upon application of torque on the engagement members 22 and 24). In a step 906, a malfunction of the generator may be detected. In a step 908 an axial withdrawal mechanism may be activated (a pilot may activate a solenoid 40 to apply a brake 38 and produce axial motion of the engagement member 22 through operation of a ball-screw assembly). In a step 910, angular and axial displacement between the engagement members may provide for disengagement of the engine from the generator (e.g., the inner ball screw 16 may produce axial force on the engagement member 22 sufficient to overcome the axial force produced by the angled sides of the teeth 22-1 and 24-1)

It should be understood, of course, that the foregoing relates to exemplary embodiments of the invention and that modifications may be made without departing from the spirit and scope of the invention as set forth in the following claims.

We claim:

1. A disengagement assembly for disengaging a generator from an engine comprising:
   a rotatable inner ball screw having an angled threading on an outer surface thereof, the inner ball screw fixedly connected to an axially displaceable engagement member;
   an outer ball screw surrounding the inner ball screw;
   an angled ball track between the inner ball screw and the outer ball screw;
   a ball bearing traveling on the angled ball track; and
   a brake capable of slowing or stopping rotation of the outer ball screw so that the inner ball screw rotates relative to the outer ball screw along the ball track and slides axially thereby disengaging an engaged generator from an engine;
   the engagement member having a plurality of circumferentially disposed teeth;

the teeth having a distal circumferential width at their distal ends and a proximal circumferential width at their proximal ends;

wherein the distal circumferential width is greater than the proximal circumferential width.

2. The assembly of claim 1 wherein the brake is connected to a solenoid that is remotely actuatable by a pilot when the generator malfunctions.

3. The assembly of claim 1, also including a lock capable of preventing re-engagement of the engine and the generator prior to elimination of the generator malfunction.

4. The assembly of claim 3, wherein the lock is re-settable.

5. The assembly of claim 4, wherein a spring at a proximal end of a shaft urges the inner ball screw toward the engine when the lock is reset.

6. A method of driving a generator with an engine comprising the steps of:

interlockingly engaging a first set of angled interlocking teeth connected to the engine with a second set of angled interlocking teeth connected to the generator, the first set of angled interlocking teeth being mounted on an engagement member of an inner ball screw with an angled threading on an outer surface thereof;

engaging the inner ball screw with an outer ball screw that rotates with the inner ball screw, including an angled ball track between the inner ball) screw and the outer ball screw on which a ball bearing travels;

maintaining an axial load on the inner ball screw by urging the inner ball screw toward the engine while the first and second sets of angled interlocking teeth are engaged; and actuating a brake to slow or stop rotation of the outer ball screw so that the inner ball screw rotates relative to the outer ball screw along the ball track and slides axially away from the engine and rotationally displacing the inner ball screw relative to the engine thereby disengaging the generator from the engine.

7. The method of claim 6, further comprising preventing the inner ball screw from re-engaging the engine by applying a lock after the generator is disengaged from the engine.

8. The method of claim 7, including re-engaging the generator with the engine by means of a spring upon re-setting the lock.

9. The method of claim 6, including remotely actuating a solenoid connected to the brake when the generator is malfunctioning.

* * * * *